Patented June 24, 1930

1,765,560

UNITED STATES PATENT OFFICE

PIERRE ALFRED BARBOU, OF PARIS, FRANCE, ASSIGNOR TO SOCIÉTÉ BARBOU & CIÉ., OF PARIS, FRANCE, A CORPORATION OF FRANCE

PROCESS FOR THE RECOVERY OF SODIUM SULPHITE FROM SPENT SULPHITE LIQUORS

No Drawing. Application filed January 12, 1928, Serial No. 246,388, and in France January 21, 1927.

My invention relates to a process for the recovery of the active substances contained in the residual baths resulting from the heating of cellulose substances by the use of sodium sulphite solutions. This recovery is effected by employing suitable chemical agents adapted to eliminate the organic substances by precipitation, whilst the sodium is first recovered as sulphate and is treated so as to convert it into sulphite.

In the process in which cellulose material is heated in a solution of sodium sulphite, which is made more or less alkaline, it is a known fact that the residual bath contains an organo sulphonated derivation product and sodium sulphate, which latter substance is due to the oxidizing of the sodium sulphite by the reduction of organic groups containing oxygen.

It has been found that the residual baths from the heating of straw in a solution of sodium sulphite, show the following composition:

25 per cent of sodium sulphite placed in the reaction and remaining in the free state;

25 per cent is converted into sodium sulphate;

50 per cent is fixed upon the lignine.

I have discovered that sulphuric acid will decompose the sulphonated compound, thus forming a sulphate and sulphurous anhydride, this decomposition of the sulphonated compound being accompanied by a precipitation of organic substances.

The process according to my invention is based upon the utilization of this discovery.

When the residual baths of the aforesaid composition are treated by sulphuric acid, this will form a liquid substance (sulphate of soda solution), a solid substance (organic matter), and a gaseous substance (sulphurous anhydride).

If this heterogeneous mixture of substances is treated with calcium bisulphite, the sodium sulphate will be converted into calcium sulphate with formation of sodium sulphide, thus recovering all of the active substances contained in the residual bath, and in the form of the original substances used for the heat treatment of the cellulose material.

When the various treatments have been effected, the organic substances are removed from the solution by filtering or decanting. The solutions are returned to the treating room, and the organic substances may be used as fuel, or may be distilled by dry treatment for the obtainment of the known series of pyroligneous bodies.

For the practical execution of the said process, we begin by determining, by incineration, the quantity of soda fixed upon the organic molecule, and we add, to a determined quantity of residual bath, the equivalent amount of sulfuric acid as found by calculation, so as to form the corresponding amount of sodium sulphate. Since the sulphurous acid set free by the reaction is quite soluble in water, there will be no visible disengagement of this substance.

This heterogeneous combination is then treated by a bisulphite of an alkali earth, by which we again precipitate calcium sulphate, thus facilitating the precipitation of the organic substances from the mother liquor.

The whole is placed in the decanting apparatus, in which the solid and liquid parts are separated by gravity. The liquid is used again for the treating bath, after the excess of $SO_2$ has been neutralized with caustic soda or sodium carbonate, and this furnishes another quantity of sulphite. The organic substances are placed in the filter press, and are then distilled by a dry treatment, or burnt.

In this manner I effect the complete recovery of the active substances, since the whole of the sodium is finally converted into sulphite, which is an essential agent in the heating process, whilst the organic substances, which are collected in the solid state, may also be properly utilized.

Obviously, the details of the said process may be varied according to circumstances, and it will be necessary in each case to determine, by calculation or by laboratory tests, the amount of the reagents which are to be employed in order to avoid all waste of material.

However the treatment of the residual substances by sulfuric acid, effected in the conditions above specified, will destroy not only the sulfo-organo-sodic bodies, but also the free sodium sulphite remaining in the residual baths thus producing sulfurous acid and sodium sulfate.

This treatment necessarily requires the consumption of one molecule of sulfuric acid for one molecule of free sodium sulphite remaining in the residual bath, and this must be subsequently reconstituted. Accordingly I may reduce this consumption, by converting the sulphite into sulfate by a less expensive reaction, before using the sulfuric acid for the last stages of the treatment of the bath.

I have found that if the residuary bath is treated by air, the sodium sulphite in the bath can be converted into sodium sulfate by oxidation, thus economizing the molecule of sulfuric acid required for this conversion.

The said invention may be practically carried into effect in the following manner. The residual bath obtained from the heating of vegetable substances in a solution containing sodium sulphite, is treated by a current of air, either by bubbling or by counter-flow, in towers provided with baffle plates forming surface elements, a flow of air is provided either by suction or delivery.

When all traces of sulphite have disappeared, the residual substances are treated with sulfuric acid, according to the methods described in the first part of the specification.

I have further observed that it will be even unnecessary to add sulfuric acid to the residual baths in order to displace the sulfo-organo-sodic bodies from their combinations, provided I cause the formation of nascent sulfuric acid in the baths themselves; the said acid is produced by electrolytic means, and the oxidized residual baths serve as the electrolyte.

In fact, after the oxidation takes place, the liquid part of such residual baths consists exclusively of sodium sulfate; but if a solution of sodium sulfate is traversed by an electric current, a decomposition will take place. The $SO_3$ ion will proceed to the anode, and the Na ion will proceed to the cathode; the $SO_3$ combines with the water to produce $H_2SO_4$, and the Na combines with water to produce caustic soda. The sulfuric acid, which is set free at the anode, acts upon the sulfo-organo-sodic body and produces sodium sulfate, organic matter being precipitated during this reaction.

In the practical processes according to the invention, two cases may be considered.

Firstly, if the electrolysis takes place by the use of an electrolytic apparatus unprovided with a diaphragm, it will be difficult to pursue the reaction, for the sulfuric acid formed at the anode will preferably combine with the caustic soda set free at the cathode, without reacting upon the sulfo-organo-sodic body, thus operating in an electrolytic circuit which is partly closed.

If the electrolysis is effected by means of an apparatus provided with a diaphragm, the resulting sulfuric acid will be separated from the soda. The sulfuric acid acts upon the sulfo-organo-sodic body and thus produces sodium sulfate and organic matter; the soda produced at the cathode is removed for further use for neutralizing the more or less acid sodium sulphite resulting from the treatment of the sodium sulfate by the calcium bisulphite, which treatment is specified in the first part of the specification.

For these reasons I prefer to employ an electrolytic apparatus of the counter-flow type provided with a diaphragm, in which the anodes may consist of any substance which is unaffected by sulfuric acid or by oxidation, for instance alloys such as ferro-chromium or ferro-nickel, or hematite. The diaphragms may consist of cotton or asbestos.

Claims:

1. The method of recovering sodium sulphite from spent sulphite liquors, which consists in treating the liquors with sulfuric acid to convert the sodium compounds into sulphate, and transforming the latter into sodium sulphite by the addition of an alkali earth bisulphite.

2. The method of recovering sodium sulphite from spent sulphite liquors, which consists in treating the liquors with sulfuric acid to convert the sodium compounds into sulphate, and transforming the latter into sodium sulphite by the addition of calcium bisulphite.

In testimony whereof I affix my signature.

PIERRE ALFRED BARBOU.